(12) United States Patent
Muhlhoff et al.

(10) Patent No.: US 10,717,327 B2
(45) Date of Patent: Jul. 21, 2020

(54) TIRE TREAD COMPRISING A BLOCK HAVING A PLURALITY OF CUTOUTS

(71) Applicant: COMPAGNIE GENERALE DES ETABLISSEMENTS MICHELIN, Clermont-Ferrand (FR)

(72) Inventors: Olivier Muhlhoff, Clermont-Ferrand (FR); Benoit Durand-Gasselin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 227 days.

(21) Appl. No.: 15/570,087

(22) PCT Filed: May 4, 2016

(86) PCT No.: PCT/FR2016/051055
§ 371 (c)(1),
(2) Date: Oct. 27, 2017

(87) PCT Pub. No.: WO2016/177973
PCT Pub. Date: Nov. 10, 2016

(65) Prior Publication Data
US 2018/0126790 A1    May 10, 2018

(30) Foreign Application Priority Data

May 7, 2015 (FR) ..................... 15 54090

(51) Int. Cl.
*B60C 11/03* (2006.01)
*B60C 11/12* (2006.01)

(52) U.S. Cl.
CPC ...... *B60C 11/0306* (2013.01); *B60C 11/1204* (2013.01); *B60C 11/1236* (2013.01);
(Continued)

(58) Field of Classification Search
CPC ............ B60C 11/1204; B60C 11/1236; B60C 2011/0358; B60C 2011/0372; B60C 2011/0383; B60C 2011/1209
See application file for complete search history.

(56) References Cited

U.S. PATENT DOCUMENTS 5,766,383 A * 6/1998 Hasegawa ............... B60C 11/00
152/209.18
9,180,738 B2 * 11/2015 Yumii ................. B60C 11/0318
(Continued)

FOREIGN PATENT DOCUMENTS

CN    200971030 Y    11/2007
CN    103182904       7/2013
(Continued)

OTHER PUBLICATIONS

Office Action dated Dec. 4, 2018 issued in Chinese Patent Application No. 201680026094.7.

*Primary Examiner* — Jacob T Minskey
*Assistant Examiner* — Virak Nguon
(74) *Attorney, Agent, or Firm* — Cozen O'Connor

(57) ABSTRACT

Tire tread comprising elongate block (3) of rubbery material extending in a circumferential direction of the tire. Elongate block (3) comprises ground contact surface (5) delimited by first and second lateral walls (7, 9). Elongate block (3) comprises successive sets of cutouts (6) in the circumferential direction, each set extending in an oblique direction and opening onto the first and second lateral walls, and distributed over the ground contact surface such that, when a set of cutouts reaches second lateral wall (9), another set of cutouts starts out from first lateral wall (7) at the same circumferential level. Each set of cutouts comprises two cutouts, each one extending as far as a cutout end (13a, 13b) which does not open onto a lateral wall. Ends such two
(Continued)

cutouts are disposed at the same circumferential level. Cutouts of the same set of cutouts do not overlap in a transverse direction.

6 Claims, 2 Drawing Sheets

(52) U.S. Cl.
CPC ... *B60C 11/0304* (2013.01); *B60C 2011/0358* (2013.01); *B60C 2011/0372* (2013.01); *B60C 2011/0383* (2013.01); *B60C 2011/1209* (2013.01)

(56) References Cited

U.S. PATENT DOCUMENTS

| | | | |
|---|---|---|---|
| 9,211,768 B2 * | 12/2015 | Inoue | B60C 11/12 |
| 2010/0186860 A1 * | 7/2010 | Georges | B60C 11/0306 |
| | | | 152/209.18 |
| 2013/0014871 A1 * | 1/2013 | Georges | B60C 11/04 |
| | | | 152/209.18 |
| 2013/0167997 A1 * | 7/2013 | Hayashi | B60C 11/04 |
| | | | 152/209.18 |
| 2015/0375571 A1 * | 12/2015 | Koishikawa | B60C 11/0306 |
| | | | 152/209.18 |
| 2016/0375728 A1 * | 12/2016 | Kuriyama | B60C 11/0306 |
| | | | 152/209.8 |
| 2017/0305198 A1 * | 10/2017 | Ichimura | B60C 11/03 |
| 2017/0305199 A1 * | 10/2017 | Hatanaka | B60C 11/0008 |

FOREIGN PATENT DOCUMENTS

| | | |
|---|---|---|
| DE | 40 19 386 | 1/1991 |
| EP | 0 282 765 | 9/1988 |
| EP | 0 324 605 | 7/1989 |
| FR | 2 763 892 | 12/1998 |
| WO | WO 2012/032144 | 3/2012 |

* cited by examiner

TIRE TREAD COMPRISING A BLOCK HAVING A PLURALITY OF CUTOUTS

RELATED APPLICATIONS

This is a U.S. National Phase Application under 35 USC 371 of International Application PCT/FR2016/051055 filed on May 4, 2016.

This application claims the priority of French application no. 15/54090 filed May 7, 2015, the entire content of which is hereby incorporated by reference.

FIELD OF THE INVENTION

The present invention relates to a tread for a motor vehicle tire provided with means for substantially reducing running noise.

BACKGROUND OF THE INVENTION

Usually, passenger vehicle tires are provided with a carcass reinforcement which nowadays is radial in the great majority of cases; in this configuration, the reinforcers of the carcass reinforcement are disposed so as to make an angle greater than or equal to 80 degrees and less than 100 degrees with a circumferential direction.

Moreover, tires are provided with a crown reinforcement comprising a plurality of reinforcers embedded in an elastomer-based material. This crown reinforcement is covered radially on the outside by a tread made of rubbery material, this tread having a surface, referred to as the tread surface, intended to be in contact with the road during running.

In order to ensure a level of safety that is essential when driving in the wet, notably, it is a known procedure to provide the tread with a plurality of longitudinal grooves of circumferential overall orientation.

One drawback with the presence of longitudinal grooves is the generation of vibrations in the air flowing through these grooves, notably in the region of contact with the road. These vibrations are the source of resonances that generate running noise.

The document EP0324605 discloses a tread comprising a plurality of blocks aligned in a circumferential direction. In that document, the blocks are inclined at a particular angle in order to reduce the generation of running noise.

The document WO2012032144 discloses a tread comprising a plurality of elongate blocks extending in the circumferential direction. Each elongate block comprises a plurality of sipes of transverse overall orientation in order to improve the grip of the tread, notably when braking on wet ground.

There is a need to limit the generation of noise by a tread comprising at least one elongate block extending in a circumferential direction.

Definitions

A "tire" means all types of resilient tread, whether or not it is subjected to an internal pressure.

The "tread" of a tire means a quantity of rubbery material delimited by lateral surfaces and by two main surfaces, one of which is intended to come into contact with a road surface when the tire is being driven on.

The "tread surface" means the set of points of the tread that are in contact with the road surface when the tire, inflated to its reference pressure, is driven on this road surface. The reference inflation pressure is defined under the use conditions of the tire as defined notably by the E.T.R.T.O. ("European Tire and Rim Technical Organisation") standard. The width C of the tread surface is notably defined by the ETRTO standard such that $C=(1.075-0.005ar)*S^{1.001}$, where ar is the nominal aspect ratio and s is the theoretical section width on a measuring rim.

A "block" on a tread means a raised element delimited by grooves and comprising lateral walls and a contact face, the latter being intended to come into contact with the ground during running.

An "elongate block" means a block having a width and a length around the circumference of the tire, this length being much greater than the width.

A "rib" means an elongate block which extends around the entire circumference of the tire.

A "groove" means a cutout in the tread delimiting walls of material, the width of this cutout being such that the walls associated with this cutout cannot come into contact with one another under normal running conditions. The width of a groove is greater than 2 millimetres.

A "sipe" means a cutout in the tread delimiting walls of material, the width of this cutout being suitable for allowing the walls of the sipe to come at least partially into contact as they pass through the contact patch in which the tire is in contact with the ground. The width of a sipe is less than or equal to 2 millimetres.

A "transverse direction" or "axial direction" means a direction parallel to the axis of rotation of the tire.

A "circumferential direction" means a direction tangential to any circle centred on the axis of rotation. This direction is perpendicular to the axial direction.

An "oblique direction" means a direction that has an axial component and a circumferential component, neither of which is zero.

A "circumferential level" means a set of points that form a straight line, this straight line being perpendicular to the circumferential direction.

SUMMARY OF THE INVENTION

An embodiment of the invention relates to a tire tread comprising at least one elongate block of rubbery material of width W and length L, where L>>W. The elongate block extends in a circumferential direction when the tread is mounted on the tire, the elongate block comprising a contact surface intended to come into contact with the ground and a first lateral wall and a second lateral wall delimiting this contact surface. The elongate block comprises successive sets of cutouts in the circumferential direction X, each set of cutouts extending in an oblique direction and opening onto the first lateral wall and onto the second lateral wall. The sets of cutouts are distributed over the contact surface of the elongate block such that, when a set of cutouts reaches the second lateral wall, another set of cutouts starts out from the first lateral wall at the same circumferential level on the elongate block. Each set of cutouts comprises two cutouts, each cutout of the set of cutouts extending as far as a cutout end which does not open onto a lateral wall of the elongate block. The ends of the two cutouts of the set of cutouts are disposed at the same circumferential level N in the elongate block. The cutouts of one and the same set of cutouts do not overlap in a transverse direction Y. Thus, the projections of the cutouts in one and the same set do not overlap in this transverse direction Y.

The invention therefore proposes ensuring continuity in the organization of the cutouts in the elongate block. Specifically, when a cutout reaches one of its ends, another cutout starts out at the same circumferential level. This limits the variation in the void ratio in the circumferential direction in the elongate block and the acoustic performance of the tire is improved as a result.

In another variant embodiment, the cutouts have curved shapes at the contact surface of the elongate block.

By using cutouts with a curved shape, the overall appearance of the tread is made more attractive while at the same time the noise generated by the tire is limited.

In one variant embodiment, the cutouts comprise at least two parts with different inclinations.

By using complex cutouts comprising at least two parts with different inclinations, it is possible to improve the grip on wet ground both when cornering and when driving in a straight line.

In another variant embodiment, two adjacent cutouts in the elongate block have different inclinations and/or different shapes and/or different lengths.

By combining different cutouts, the scrambling of the sound signal emitted by the elongate block during running is improved.

In another variant embodiment, the cutouts are sipes.

This improves the grip of the tread on wet ground without excessively reducing the overall stiffness of the elongate block.

In another variant embodiment, the cutouts are grooves.

This improves the flow of water out of the tread when the tire is running on wet ground.

BRIEF DESCRIPTION OF THE DRAWINGS

Other features and advantages of the invention will become apparent from the following description, given by way of non-limiting example, with reference to the attached drawings in which.

DETAILED DESCRIPTION OF THE DRAWINGS

In the following description, elements which are substantially identical or similar will be denoted by identical references.

Figure 1:
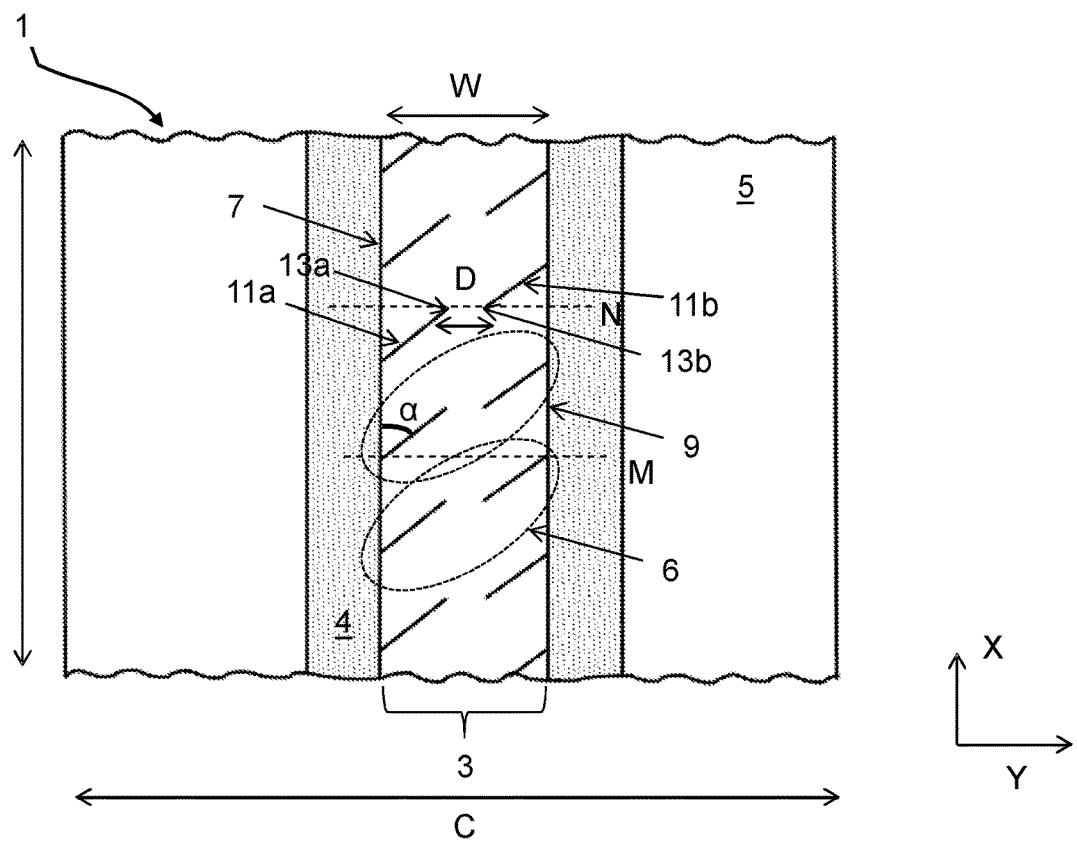
FIG. 1 schematically shows a partial view of a tread according to a first embodiment of the invention.

FIG. 1 shows a partial view of a tread 1 of a tire according to a first embodiment of the invention.

The tread 1 comprises at least one elongate block 3 of rubbery material. The elongate block 3 is delimited here by two grooves 4 which have been shaded grey in FIG. 1 in order to make the invention easier to understand. The elongate block 3 has a width W and a length L, this length L being much greater than the width W. Much greater means that the length L is at least equal to 5 times the width W. In this way, when the tread 1 is mounted on a tire, the elongate block 3 looks like a strip extending in a circumferential direction X. This strip may extend around the entire circumference of the tire and the elongate block then corresponds to a rib. Alternatively, this strip extends around only part of this circumference.

The elongate block 3 comprises a contact surface 5 intended to come into contact with the ground and a first lateral wall 7 and a second lateral wall 9 delimiting this contact surface 5. The elongate block 3 also comprises a plurality of oblique cutouts 11a, 11b that open either onto the first lateral wall 7 or onto the second lateral wall 9 and extend as far as cutout ends 13a, 13b which do not open out onto the lateral walls 7, 9.

The cutouts 11a, 11b are organized in a set of cutouts. Each set of cutouts extends in an oblique direction opening onto the first lateral wall 7 and onto the second lateral wall 9. The sets of cutouts 6 are distributed over the contact surface of the elongate block such that, when a set of cutouts reaches the second lateral wall 9, another set of cutouts starts out from the first lateral wall 7 at the same circumferential level M on the elongate block.

Each set of cutout of the set of cutouts 6 extends as far as a cutout end 13a, 13b which does not open onto a lateral wall 7, 9 of the elongate block. The ends 13a, 13b of the two cutouts of the set of cutouts are disposed at the same circumferential level N in the elongate block 3.

It will be noted that, in the example in FIG. 1, the cutouts 13a, 13b do not overlap in a transverse direction Y. Specifically, there is a stretch D of rubber between the two ends 13a, 13b. This stretch D is equal for example to at least 10% of the width W of the elongate block. This ensures continuity of rubber in the elongate block, thereby making it possible to maintain good overall stiffness in this block.

The cutouts 11a, 11b reach the wall of the elongate block at an angle α.

In one non-limiting embodiment, the angle α is greater than or equal to 55°.

Figure 2:
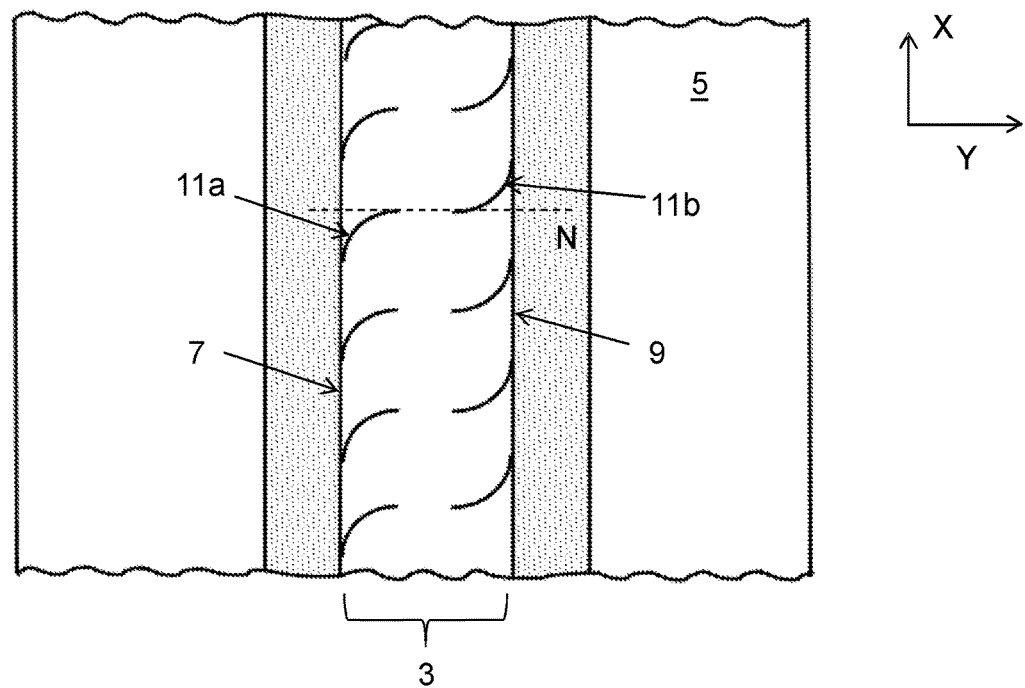
FIG. 2 schematically shows a second variant embodiment of the invention.

FIG. 2 depicts another variant embodiment, in which the cutouts have a curved shape. The cutouts of one and the same set of cutouts 6 do not overlap in a transverse direction Y.

In one non-limiting embodiment, the cutouts are complex and comprise at least two parts with different inclinations.

Figure 3:
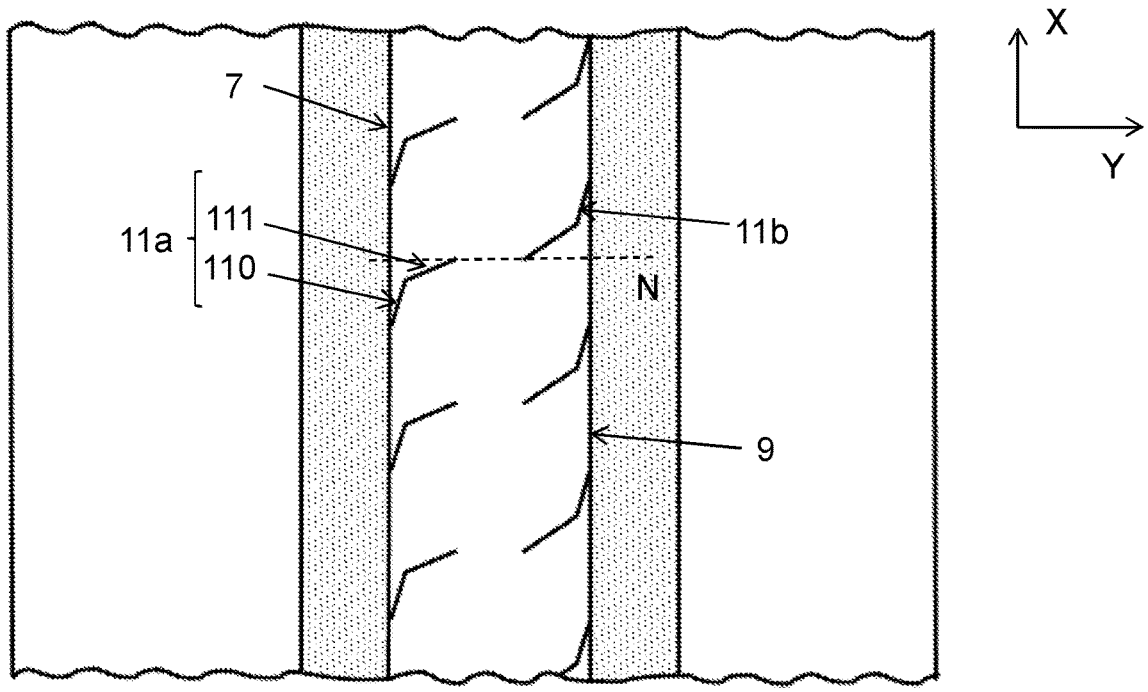
FIG. 3 schematically shows a third variant embodiment of the invention.

In another non-limiting embodiment that is illustrated in FIG. 3, the cutouts 11a comprise only a first part 110 and a second part 111. The first part 110 of the cutout 11a starts out from one of the lateral walls 7 of the elongate block, and the second part 111 continues the first part 110 in the direction of the other lateral wall 9. The first part 110 and the second part 111 have two different inclination angles. The cutouts of one and the same set of cutouts 6 do not overlap in the transverse direction Y.

Figure 4:
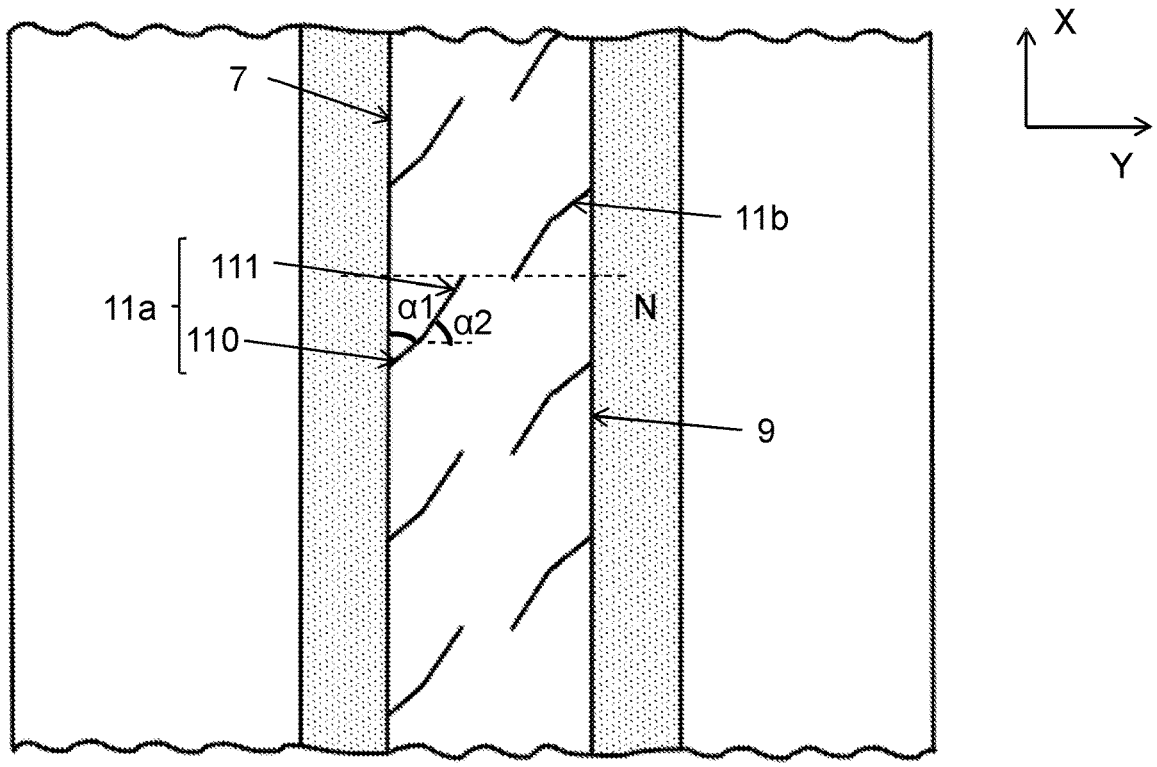
FIG. 4 schematically shows a fourth variant embodiment of the invention.

In one non-limiting embodiment that is illustrated in FIG. 4, the first part 110 of the cutout 11a makes a first angle α1 with the elongate block. This first angle α1 is greater than or equal to 55°. This avoids the creation of a thin and fragile area of rubber between the cutout 11a and the lateral wall 7 of the elongate block.

In another embodiment, the second part 111 makes a second angle α2 with the transverse direction Y. This second angle α2 is greater than or equal to 55°.

The invention is not limited to the examples described and shown and various modifications can be made thereto without departing from its scope.

Thus, combinations of sipes having different inclinations and/or different shapes and/or different lengths are possible. The noticeable features of the tread pattern noise spectrum are decreased, and the scrambling of the sound signal emitted by the tread pattern of the tire is thus improved.

FIGS. 1 to 3 depict embodiments in which the cutouts are sipes having small widths. Alternatively, the sipes are grooves having greater widths. In the case of grooves, the neutral axis concept is used to determine the same circumferential level between two adjacent grooves.

In another embodiment, it is possible, for example, to provide for the cutouts to be chamfered at the contact surface of the elongate block.

The invention claimed is:

1. A tire tread comprising at least one elongate block having a rubber material of width W and length L, where L>>W, said elongate block extending in a circumferential direction when the tread is mounted on the tire, the elongate block comprising a contact surface adapted to come into contact with the ground and a first lateral wall and a second lateral wall delimiting said contact surface, wherein the elongate block comprises successive sets of cutouts in the circumferential direction, each said set of cutouts comprising a first cutout extending in an oblique direction and opening onto the first lateral wall and a second cutout extending in the oblique direction and opening onto the second lateral wall, the sets of cutouts being distributed over the contact surface of the elongate block such that, when the second cutout of any set of cutouts reaches the second lateral wall, the first cutout of another set of cutouts starts out from the first lateral wall at the same circumferential level on the elongate block, and wherein each of said first and second cutouts of any set of cutouts extends as far as a cutout end which does not open onto a said lateral wall of the elongate block, the ends of the first and second cutouts of any set of cutouts being disposed at the same circumferential level in the elongate block, and do not overlap in a transverse direction, wherein each first and second cutout of any set of cutouts has a curved shape at the contact surface of the elongate block such that the cutout ends of the first and second cutouts of any set of cutouts are co-linear with respect to one another along a line defining the same circumferential level.

2. The tread according to claim 1, wherein the cutouts reach their respective wall at an angle a to the elongate block, said angle a being greater than or equal to 55°.

3. The tread according to claim 1, wherein the cutouts comprise at least two parts with different inclinations.

4. The tread according to claim 1, wherein the cutouts are sipes.

5. The tread according to claim 1, wherein the cutouts are grooves.

6. The tread according to claim 1, wherein the elongate block is a rib.

* * * * *